(No Model.)
D. SHEEDY.
APPARATUS FOR SEPARATING MATTE FROM SLAG.
No. 475,522. Patented May 24, 1892.
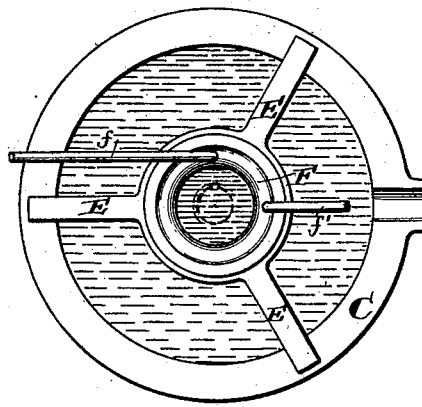
FIG. 3.
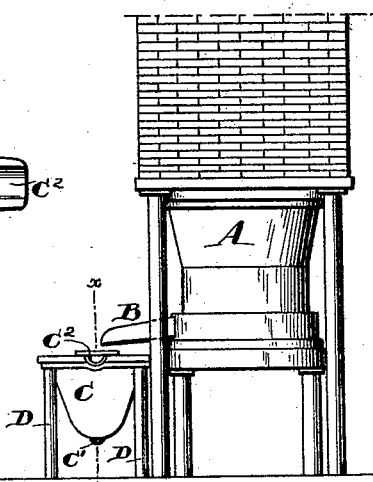
FIG. 1.
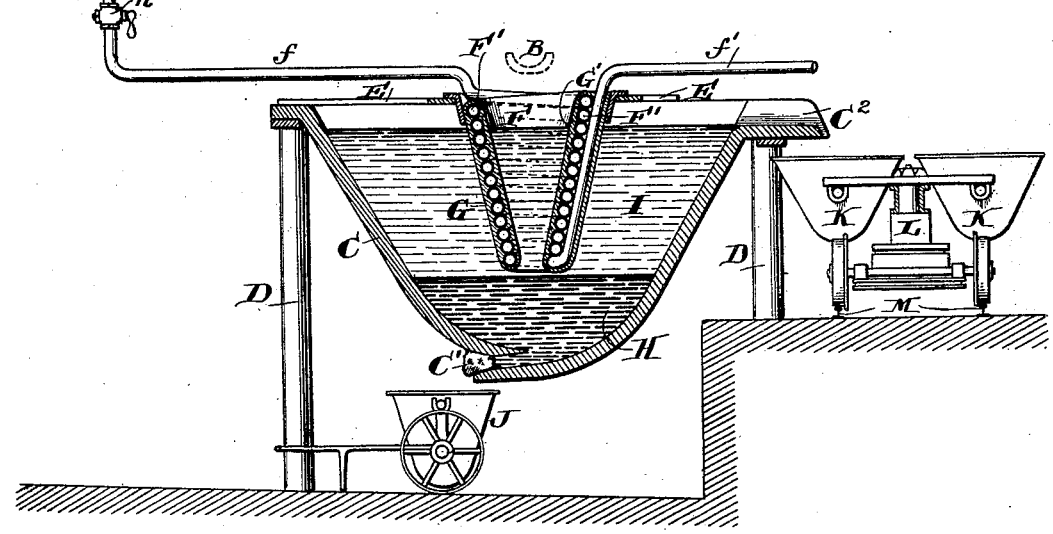
FIG. 2.
FIG. 4.
Witnesses:
Henry Drury
J. F. Russell
Inventor:
Dennis Sheedy
by his atty.
Francis T. Chambers

UNITED STATES PATENT OFFICE.

DENNIS SHEEDY, OF DENVER, COLORADO.

APPARATUS FOR SEPARATING MATTE FROM SLAG.

SPECIFICATION forming part of Letters Patent No. 475,522, dated May 24, 1892.

Application filed December 1, 1891. Serial No. 413,653. (No model.)

*To all whom it may concern:*

Be it known that I, DENNIS SHEEDY, of the city of Denver, county of Arapahoe, and State of Colorado, have invented a certain new and Improved Apparatus for Separating Matte from Slag, of which the following is a true and exact description, reference being had to the accompanying drawings, which form a part of this specification.

My invention relates to a device intended for use with metallurgical furnaces, the purpose of which is to effect a separation and saving of the matte which is drawn from the furnace together with the slag.

Generally speaking, the device consists of a receptacle of the nature of a fore-hearth, in connection with which I use a conduit, which is supported within the receptacle, so that its lower end is near the bottom thereof, while its upper end is so placed as to receive the mixture of matte and slag as it runs from the furnace. The matte being heavier than the slag, of course tends to settle in the bottom of the receptacle; but as it is in a fine state of division it is difficult to effect a satisfactory separation merely by subsidence or gravity, and it therefore becomes important to effect a union of the matte particles—that is to say, to bring the small particles either in contact with the mass of matte in the bottom of the receptacle or with each other, so that they will form larger particles, the subsidence of which will be more rapid. By passing the mixture from the furnace into the receptacle through the conduit above mentioned the particles of matte have a tendency to unite with each other as they pass through the conduit, and as they pass out of its lower end they are brought in contact with the matte accumulated at the bottom and with which they will coalesce. Another point to be noted is that as the mixture issues from the conduit it moves both outward and upward, the mass, however, having the momentum of this downward motion through the conduit, the heavier particles consisting of the matte do not change their direction as rapidly as the mass of slag. Here again there is a tendency to bring the parts together and in contact with the matte mass at the bottom. Preferably I make the conduit of a funnel or cone shape, the smaller end being at the bottom.

This construction of the inlet-passage has also an important effect both in bringing the matte particles together and in increasing the rapidity of flow from the bottom of the conduit. Preferably, also, I form the conduit of spirally-coiled pipe, through which water can pass while it is in use, and in all cases I prefer to protect the conduit by means of a suitable covering applied both within and without. These and other features of my invention will be best understood as described in connection with the drawings, in which it is illustrated, and in which—

Figure 1 is a side elevation of the lower portion of a furnace, showing the slag-receptacle in front of it. Fig. 2 is a sectional elevation begun on the section-line $x\ x$ of Fig. 1, showing, also, a device for removing the slag, which is omitted from Fig. 1 to avoid complicating the drawings. Fig. 3 is a plan view of the slag receptacle and conduit. Fig. 4 is a sectional elevation of a modified form of conduit.

A indicates the furnace, and B a slag-spout leading therefrom.

C is the receptacle for slag and matte, supported beneath the spout B in any convenient way, as by standards D D, &c.

E is a spider, the purpose of which is to support the conduit F, which is preferably made conical or funnel-shaped, as shown both in Figs. 2 and 4.

In Fig. 2 the conical conduit is formed of a spirally-wound copper tube $F'$, one end of which is connected with the tube $f$, leading from the water-receptacle N, $n$ being the controlling-cock. The other end of the spirally-wound tube connects through the tube $f'$, which leads out beyond the slag-receptacle for the discharge of water.

In Fig. 4 the cone is formed of a casting $F^2$, and in both cases the cone proper is protected by some suitable mixture to prevent direct contact with the slag and matte. I will mention here that a suitable mixture for this purpose may be composed of a mixture of three parts ground quartz and one part plastic clay.

I prefer to form in the bottom of the receptacle C an opening $C'$, through which the accumulated matte may be withdrawn from time to time, as by letting it run into a suitable matte-pot J. At the top of the receptacle C, I form a slag-spout $C^2$, through which the slag constantly runs to some suitable receptacle.

As shown, K K indicate two slag-pots pivotally mounted on the trunk L, running on tracks M.

While I prefer to form the conduit G of spirally-wound tubing, as shown, it will be obvious that any hollow-walled cast or molded conduit through the walls of which water can be caused to flow would be within my invention.

Having now described my invention, what I claim as new, and desire to secure by Letters Patent, is—

1. In combination with a receptacle for slag and matte, a slag-conduit arranged to receive the slag and deliver it to the receptacle, said conduit being supported in said receptacle and opening near the bottom thereof, a furnace, and a slag-spout leading from the furnace with its mouth arranged over the slag-conduit aforesaid, substantially as and for the purpose specified.

2. In combination with a receptacle for slag and matte, a conical slag-conduit arranged to receive the slag and deliver it to the receptacle, said conduit being supported in said receptacle and opening near the bottom thereof, a furnace, and a slag-spout leading from the furnace with its mouth arranged over the slag-conduit aforesaid, substantially as and for the purpose specified.

3. In combination with a receptacle for slag and matte, a conduit formed of spirally-wound tubing suitably protected, supported in said receptacle, and opening near the bottom thereof, substantially as and for the purpose specified.

4. In combination with a receptacle for slag and matte, a conical conduit formed of spirally-wound tubing suitably supported in said receptacle and opening near the bottom thereof, substantially as and for the purpose specified.

5. A receptacle C, having a matte-opening C' at its bottom and a slag-spout $C^2$ at its top, in combination with a conical slag-conduit F, arranged to receive the slag and deliver it to the receptacle, said conduit being supported in said receptacle, a furnace, and a slag-spout leading from the furnace, with its mouth arranged over the slag-conduit aforesaid, as and for the purpose specified.

DENNIS SHEEDY.

Witnesses:
 MALVERN W. ILES,
 JOHN W. WALKER.